(12) United States Patent
Campbell et al.

(10) Patent No.: US 8,231,354 B2
(45) Date of Patent: Jul. 31, 2012

(54) TURBINE ENGINE AIRFOIL AND PLATFORM ASSEMBLY

(75) Inventors: Christian X. Campbell, Oviedo, FL (US); Allister W. James, Chuluota, FL (US); Jay A. Morrison, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 412 days.

(21) Appl. No.: 12/638,034

(22) Filed: Dec. 15, 2009

(65) Prior Publication Data

US 2011/0142684 A1  Jun. 16, 2011

(51) Int. Cl.
*F01D 5/30* (2006.01)

(52) U.S. Cl. ............... 416/193 A; 416/219 R; 416/248

(58) Field of Classification Search .......... 416/248, 416/193 A, 244 A, 214 A, 214 R, 219 R, 416/239
See application file for complete search history.

(56) References Cited

U.S. PATENT DOCUMENTS

| | | |
|---|---|---|
| 2,942,842 A | 6/1960 | Hayes |
| 3,012,308 A * | 12/1961 | Zech et al. ............... 416/219 R |
| 3,732,031 A | 5/1973 | Bowling et al. |
| 3,810,711 A | 5/1974 | Emmerson et al. |
| 4,297,077 A | 10/1981 | Durgin et al. |
| 4,444,544 A | 4/1984 | Rowley |
| 4,583,914 A | 4/1986 | Craig et al. |
| 4,650,399 A | 3/1987 | Craig et al. |
| 5,147,180 A | 9/1992 | Johnson |
| 5,639,216 A | 6/1997 | McLaurin et al. |
| 5,797,725 A | 8/1998 | Rhodes |
| 6,331,217 B1 | 12/2001 | Burke et al. |
| 6,726,452 B2 | 4/2004 | Strassberger et al. |
| 6,786,696 B2 | 9/2004 | Herman et al. |
| 7,080,971 B2 | 7/2006 | Wilson et al. |
| 7,351,036 B2 | 4/2008 | Liang |

* cited by examiner

*Primary Examiner* — Richard Edgar

(57) ABSTRACT

A turbine airfoil (22A) is formed by a first process using a first material. A platform (30A) is formed by a second process using a second material that may be different from the first material. The platform (30A) is assembled around a shank (23A) of the airfoil. One or more pins (36A) extend from the platform into holes (28) in the shank (23A). The platform may be formed in two portions (32A, 34A) and placed around the shank, enclosing it. The two platform portions may be bonded to each other. Alternately, the platform (30B) may be cast around the shank (23B) using a metal alloy with better castability than that of the blade and shank, which may be specialized for thermal tolerance. The pins (36A-36D) or holes for them do not extend to an outer surface (31) of the platform, avoiding stress concentrations.

20 Claims, 6 Drawing Sheets

US 8,231,354 B2

TURBINE ENGINE AIRFOIL AND PLATFORM ASSEMBLY

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

This invention relates to fabrication and assembly of turbine engine airfoils and platforms, and mounting of such assemblies on a turbine disk.

BACKGROUND OF THE INVENTION

Turbine engines have at least one circular array of blades mounted around the circumference of a rotor disk. Each blade is commonly mounted by forming a mounting platform on the root or shank of the blade, in which the platform has a dovetail geometry that slides axially into a matching slot in the disk. U.S. Pat. No. 5,147,180 shows an example of a blade platform having an inverted "fir tree" geometry with multiple lateral teeth of descending width that is sometimes used.

The blade and platform may be cast integrally of an advanced single crystal superalloy such as CMSX-4 or PWA1484. However, casting the blade and platform in one piece has disadvantages. The size of the hole in the baffle through which the casting is withdrawn during the single crystal solidification process is dictated by the largest cross-sectional area of the part (usually the platform in the case of an integrally cast blade). The thermal gradient is not optimized when the baffle does not closely fit around the casting and can lead to the formation of casting defects such as low and high angle grain boundaries. It is also difficult to maintain the single crystal structure in regions where there are large geometric changes in the casting, for example in the fillet region where the airfoil transitions to the platform, and in the root/shank below the platform. Casting defects such as 'freckle chains' are often observed. Material requirements of the blade and platform are different. The blade must tolerate high temperatures and corrosive gas flow. The platform does not reach the highest temperatures of the blade, but needs strength and castability.

Forming the blade and platform as a single piece does not allow material optimization. However, forming them of separate pieces involves fastening, close tolerances, stress concentrations, and vibration issues. U.S. Pat. No. 7,080,971 shows a platform attached to a blade by a pin inserted through a hole passing completely through the platform and shank. This causes stress concentrations.

BRIEF DESCRIPTION OF THE DRAWINGS

The invention is explained in the following description in view of the drawings that show.

DETAILED DESCRIPTION OF THE INVENTION

Figure 1:
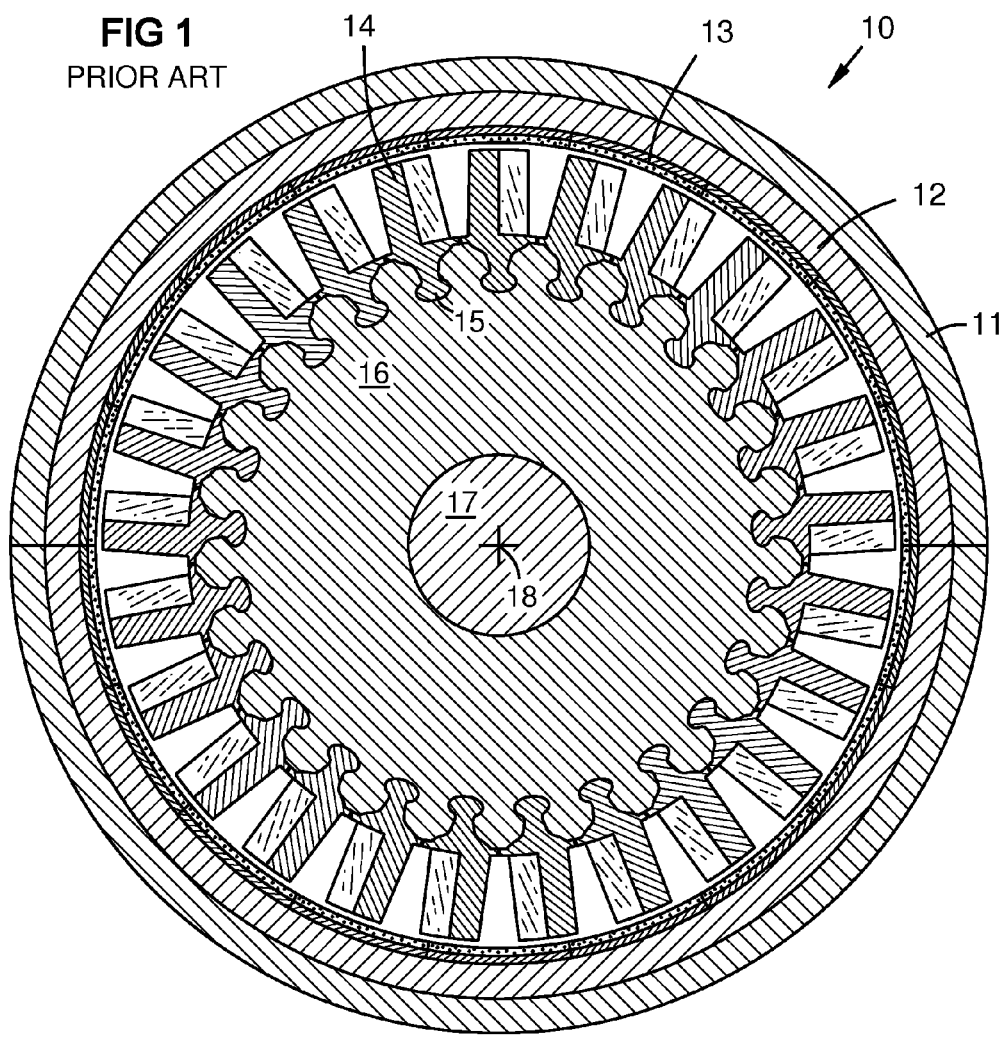
FIG. 1 is a conceptual sectional view of a gas turbine disk and blades as known in the art.

FIG. 1 shows conceptual sectional view of a known gas turbine engine 10 with a casing 11, retaining ring 12, and shroud 13, taken through a turbine rotor disk 16. Blades 14 with integral platforms 15 are mounted around the disk using a dovetail joint geometry. The disk is mounted on an axle 17 having an axis 18.

Figure 2:
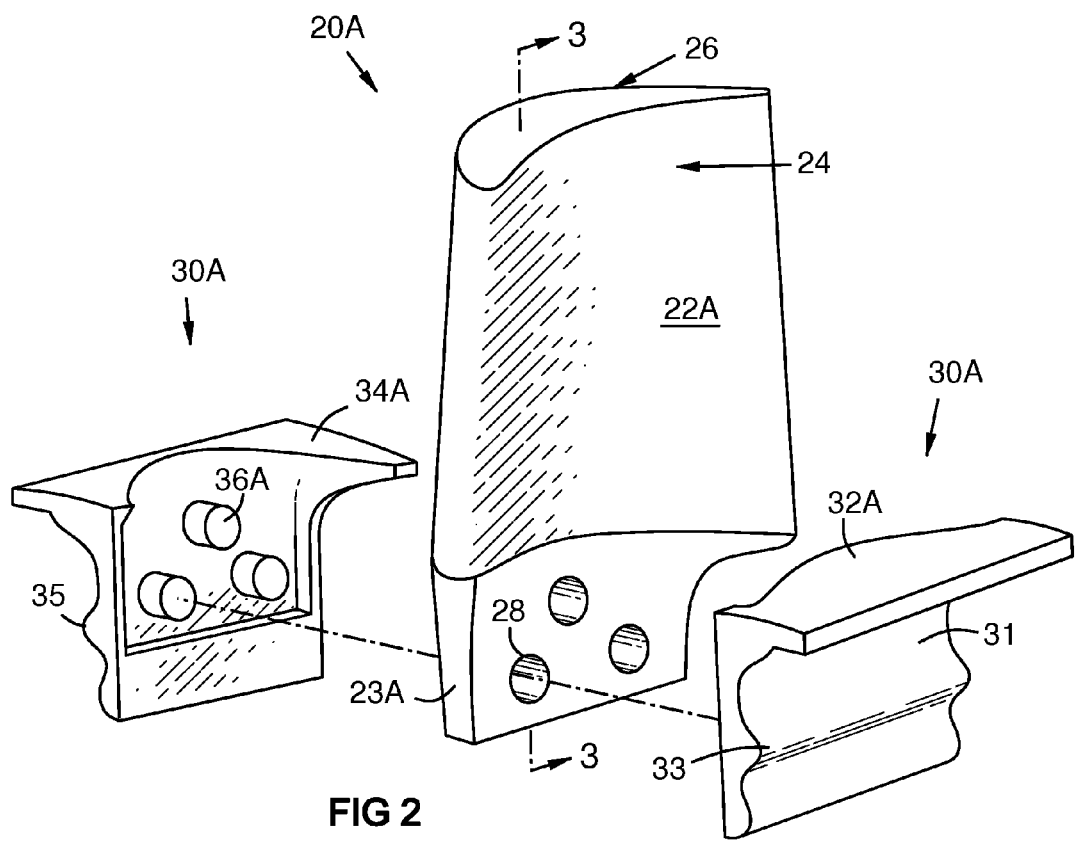
FIG. 2 is an exploded perspective view of a turbine blade and two platform halves according to the invention.

FIG. 2 shows a turbine blade assembly 20A, including an airfoil 22A having a pressure side 24, a suction side 26, and a blade shank 23A with at least one pin hole 28. A blade platform 30A has an outer surface 31, a pressure side portion 32A with at least one laterally extending tooth 33, and a suction side portion 34A with at least one laterally extending tooth 35. One or both of these platform portions have one or more pins 36A that fit the pin holes 28. After assembly, the platform 30A surrounds or brackets the blade shank 23A. The pins 36A do not extend to the outer surface 31 of the platform 30A. They may be integrally formed with the platform, reducing the thickness of the platform and reducing stress concentrations as compared to pins in holes that extend to the surface of the platform found in U.S. Pat. No. 7,080,971.

Figure 3:
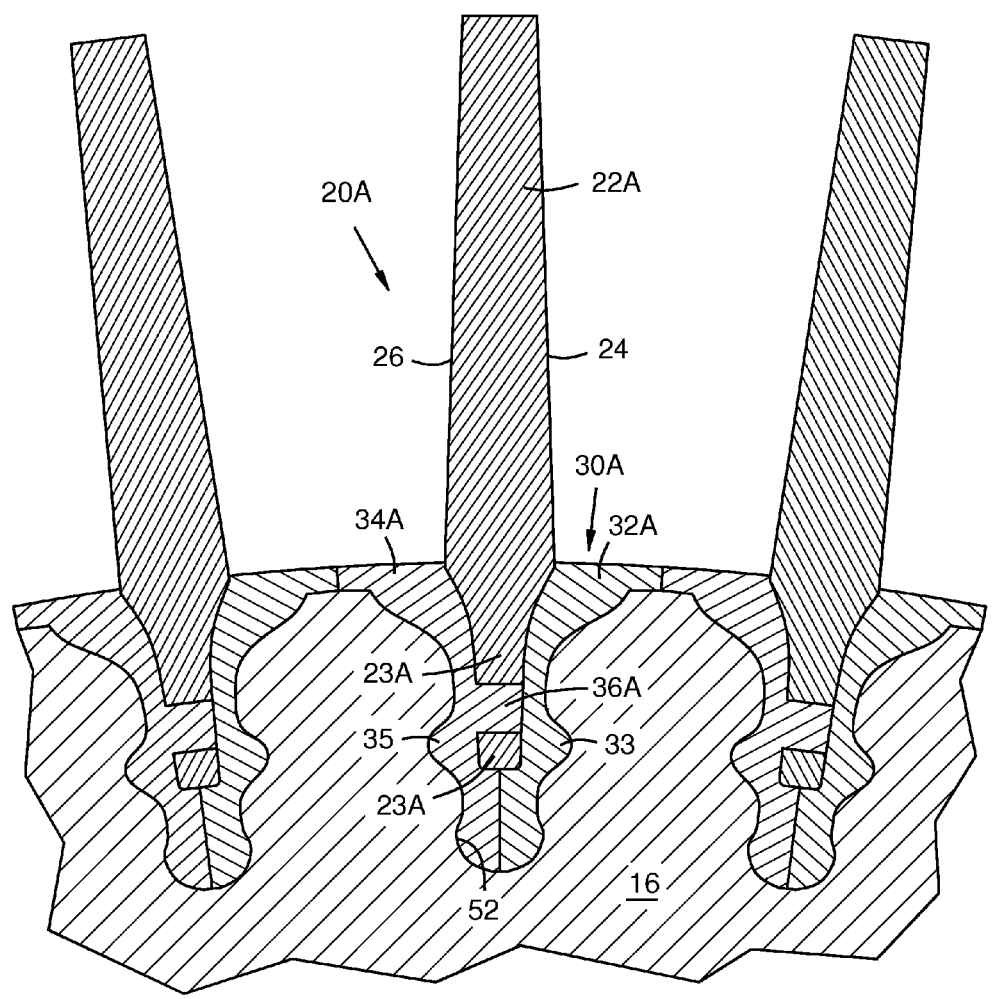
FIG. 3 is an assembled sectional front view of the blade and platform FIG. 2 taken along line 3-3 mounted in a turbine disk.

FIG. 3 shows an assembled sectional front view of FIG. 2 taken on a section plane through a pin 36A. The assembly 20A is mounted in a circular array of such assemblies in a turbine disk 16. The two platform portions 32A, 34A may be bonded to each other around the blade shank 23A by means such as metal diffusion bonding, transient liquid phase bonding, or brazing. Brazing can be practical because the platform 30A operates in a lower temperature environment than the airfoil 22A. Forming the platform in two parts, and bonding them together around the shank, allows each platform part 32A, 34A to be formed as a single crystal. Some versions of bi-casting later described may be unsuitable for forming a single-crystal platform on the shank, because the single-crystal formation temperatures can be high enough to damage the shank by recrystallizing or re-solutioning.

The centrifugal load of the airfoil 22A is transferred to the platform 30A through the pins 36A. The centrifugal load of the whole blade assembly 20A is transferred to the disk 16 by the teeth 33, 35 on the platform. The airfoil 22A and shank 23A may be formed of a first metal alloy, and the platform 30A may be formed of a second metal alloy, allowing specialization of material properties. For the same reason, the airfoil 22A and shank 23A may be formed of a ceramic or ceramic matrix composite, and the platform 30A may be formed of a metal alloy.

Figure 4:
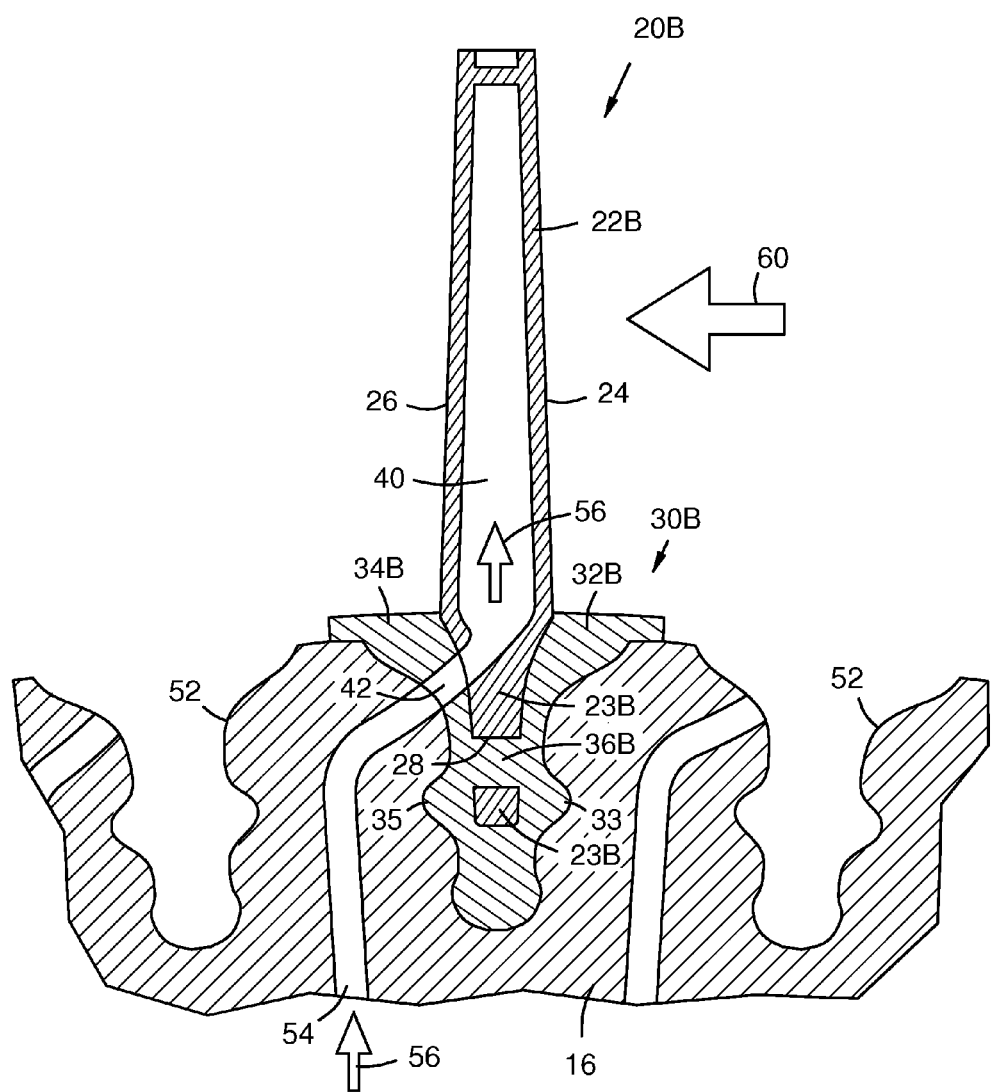
FIG. 4 is an assembled sectional front view of a second embodiment.

FIG. 4 shows a sectional view of turbine blade assembly 20B, including an airfoil 22B having a pressure side 24, a suction side 24, and a blade shank 23B with pin holes 28. A blade platform 30B has a pressure side portion 32B with at least one laterally extending tooth 33 and a suction side portion 34 with at least one opposed extending tooth 35. One or both of these platform portions may have one or more pins 36B that fit the pin holes 28. After assembly, the platform 30B surrounds or brackets the blade shank 23B. The airfoil 22B may have a cooling chamber 40 to receive a coolant fluid 56 such as air or steam via channels 54 in the disk 16. It is known to supply coolant to a turbine blade through the radially inner end of a platform. Herein, "radially" means in relation to the disk axis. The coolant may exit the blade into the working gas stream via film cooling holes in the airfoil as known in the art. In the present invention, to avoid interference with the pins 36B, a coolant passage 42 may pass between the cooling chamber 40 and a port in a side of the platform 30B. This routing not only avoids the pins but allows the radially inner end of the shank 23B to be thinner than prior art shanks with cooling passages. An optimum location for this port may be determined by stress and material analysis.

In FIG. 4 the pin 36B is shown as continuous with both sides 32B, 34B of the platform, illustrating that the platform 30B is formed by bi-casting. In this process, the blade 22B is formed first, then a mold is placed around the blade shank 23B, and the platform 30B is cast within the mold and around the blade shank 23B. Depending on the materials and the second casting temperature, the platform 30B may or may not bond to the shank 23B. In either case, the pins 36B fill the pin holes 28 and continuously bridge and integrate the first and second platform portions 32B, 34B. Such a bi-cast platform 30B is inseparable from the shank 23B. The airfoil may be cast with an alloy optimized for heat tolerance such as CMSX-4 or PWA-1483, and the platform may be cast from a different alloy with better castability, such as Mar M-509. Heat tolerance as used herein refers to a characteristic wherein a material retains its strength at an elevated operating temperature. Castability is used herein as it is commonly understood in the art to include parameters that influence castability such as pouring temperature, fluidity, shrinkage, and slag dross formation. Material specialization is desirable whether or not bi-casting is used, since the airfoil 22B endures higher thermal loads in operation than the platform 30B.

Matching of Coefficients of Thermal Expansion (CTE) of the two materials is a consideration, especially for bi-casting. Cobalt-based alloys, such as Mar M-509 have about 9% higher CTE than nickel-based alloys, such as CMSX-4. This can result in shrinkage of the platform onto the shank as the two cool, and a corresponding loosening under operational heat. The material of the airfoil/shank and the material of the platform may be the same material in some embodiments.

Bi-casting results in the platform and blade acting as single body, whether or not they are bonded. This changes and may improve the vibration characteristics of the modular blade/platform assembly. Another advantage of the bi-cast approach is that close tolerances are ensured, because the blade shank is used as a mold for the casting of the platform. Therefore, it is easier to predict uniform loading of the pins. Additional geometric features such as grooves or teeth may be provided on the blade shank for interlocking with the platform as shown in FIG. 5.

Figure 5:
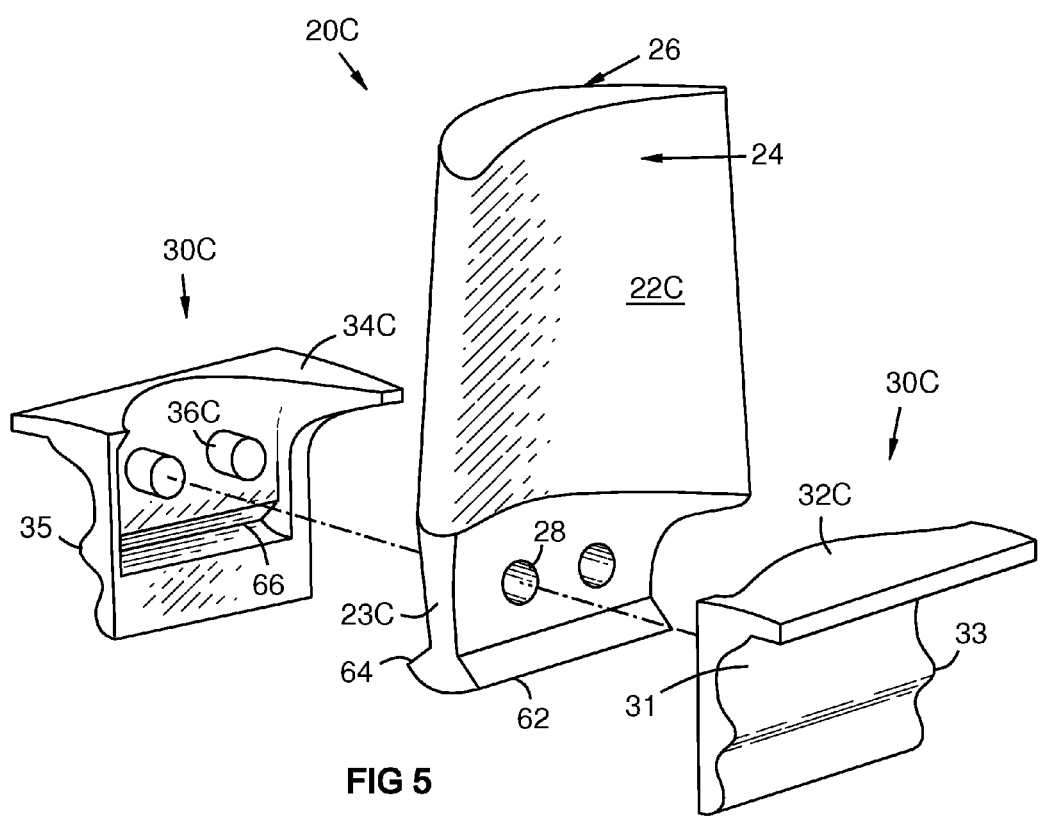
FIG. 5 is an exploded perspective view of a turbine blade and two platform halves in a third embodiment of the invention.

FIG. 5 shows a turbine blade assembly 20C, including an airfoil 22C having a pressure side 24, a suction side 26, and a blade shank 23C with pin holes 28. A blade platform 30C has an outer surface 31, a pressure side portion 32C with at least one laterally extending tooth 33, and a suction side portion 34C with at least one opposed extending tooth 35. One or both of these platform portions have one or more pins 36C that fit the pin holes 28. Teeth 62, 64 may extend laterally in opposite directions from the blade shank 23C, and fit into corresponding grooves 66 in the platform 30C. The teeth 62, 64 of the blade shank 23C may align with the teeth 33, 35 of the platform to provide room in the platform material for the teeth 62, 64 of the shank.

Figure 6:
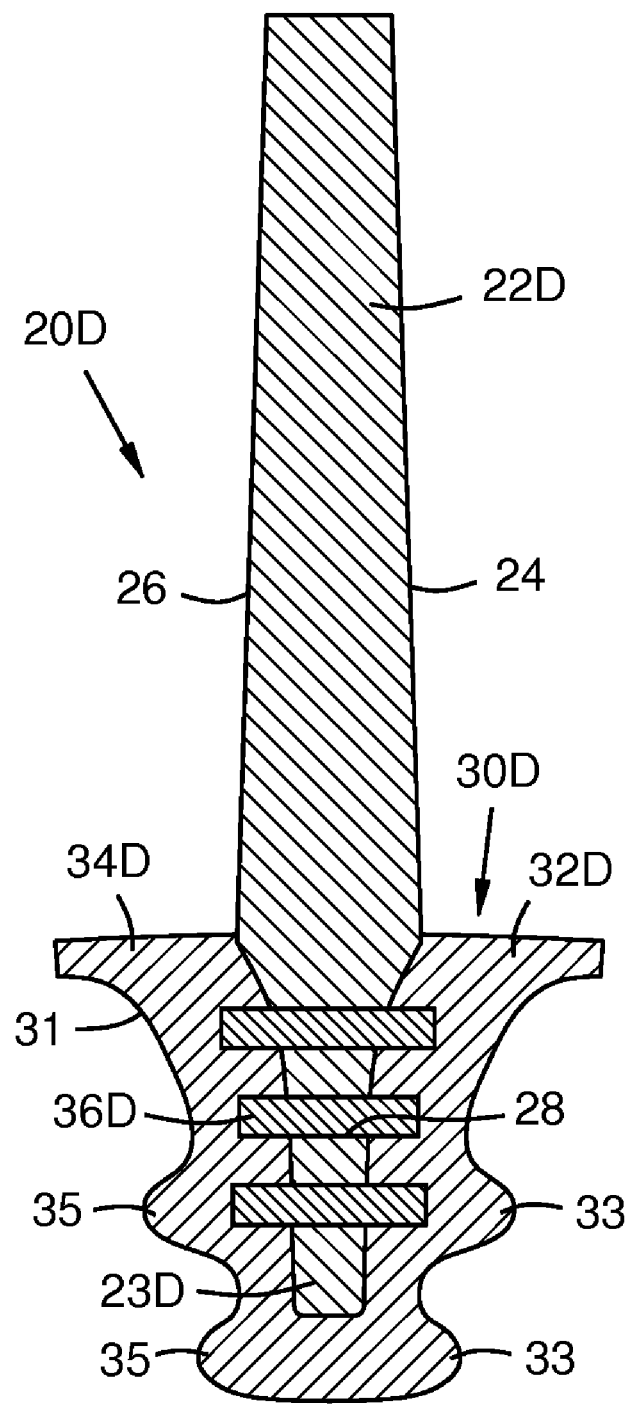
FIG. 6 is a sectional view of a fourth embodiment of the invention.

FIG. 6 shows a turbine blade assembly 20D, including an airfoil 22D having a pressure side 24, a suction side 26, and a blade shank 23D with pin holes 28. A blade platform 30D has an outer surface 31, a pressure side portion 32D with at least one laterally extending tooth 33, and a suction side portion 34D with at least one laterally extending tooth 35. One or more pins 36D are inserted into the pin holes 28, and then the platform 30D is bi-cast around the shank 23D as previously described. Although the pins 36D are separate parts, they are cast into the platform 30D with a perfect fit. The platform casting material in FIG. 6 does not have to flow into the pin holes 28 as it does in FIG. 4. The pins 36D may be formed of a material having different properties than the other pieces, such as a high strength forged alloy or a lower density material. The amount of molten material that is needed for FIG. 6 is less than that needed in the embodiment of FIG. 4 since the pins are pre-formed, thereby reducing the amount of heat available for transfer into the shank 23D during casting, thus avoiding recrystallizing or re-solutioning of the shank. In addition, the pins 36D act as a heat sink. As a result, the embodiment of FIG. 6 provides a lower risk of recrystallization of the material of the shank 23D and airfoil 22D.

In the various embodiments herein, the pins do not extend to the surface 31 of the platform, whether the pins are formed integrally with the platform as shown in embodiments 20A-20C, or are inserted in the shank then surrounded by bi-casing material of the platform as in the embodiment 20D. The invention is illustrated as a turbine blade. It may also be applied to other airfoil/platform assemblies, such as compressor blades.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A turbine airfoil and platform assembly comprising:
an airfoil comprising a shank, the airfoil and shank formed of a first material;
a platform formed of a second material, the platform enclosing or bracketing the shank; and
one or more pins through holes in the shank;
wherein said one or more pins engage the platform without holes therefore extending to an outer surface of the platform.

2. The turbine airfoil and platform assembly of claim 1, wherein the second material has better castability than the first material.

3. The turbine airfoil and platform assembly of claim 1, wherein the platform comprises a pressure side portion and a suction side portion that together enclose the shank.

4. The turbine airfoil and platform assembly of claim 3 wherein two platform portions are bonded to each other.

5. The turbine airfoil and platform assembly of claim 3 wherein two platform portions integrally form the platform, said one or more pins bridge the two platform portions continuously, and the second material has better castability than the first material.

6. The turbine airfoil and platform assembly of claim 1, wherein the platform is cast around the shank, and wherein the first material has higher heat tolerance than the second material.

7. The turbine airfoil and platform assembly of claim 1, wherein the platform comprises a pair of laterally extending opposed teeth that fit into corresponding depressions in a socket in a turbine rotor disk, and wherein the shank comprises a pair of laterally extending opposed teeth that fit into corresponding depressions in an inner surface of the platform, and wherein the teeth of the shank are aligned with the teeth of the platform.

8. The turbine airfoil and platform assembly of claim 1, wherein the pins are formed and inserted through the holes in the shank, then the platform is bi-cast around the shank and the pins.

9. The turbine airfoil and platform assembly of claim 1, wherein the airfoil comprises a cooling chamber, and the platform comprises a coolant passage between the cooling chamber and a side of the platform.

10. A turbine airfoil and platform assembly comprising:
a turbine airfoil extending from a shank;
the shank comprising a pin hole;
a platform comprising opposed pressure and suction side portions surrounding the shank;
a pair of opposed teeth on the opposed pressure and suction sides of the platform; and
a pin filling the pin hole in the shank;
wherein the pin engages the platform without a hole therefore extending to an outer surface of the platform.

11. The turbine airfoil and platform assembly of claim 10, further comprising a turbine disk comprising a slot that matches and slidably receives the platform and teeth in an axial direction that interlocks the platform with the disk, preventing radial movement therebetween.

12. The turbine airfoil and platform assembly of claim 10, further comprising a pair of opposed teeth extending laterally from opposite sides of the shank into respective matching sockets in the platform.

13. The turbine airfoil and platform assembly of claim 10, wherein the airfoil and shank are formed integrally of a first material, and the platform is formed of a second material with better castability than the first material.

14. The turbine airfoil and platform assembly of claim 13 wherein the platform is formed of two portions bonded to each other around the shank.

15. The turbine airfoil and platform assembly of claim 13, wherein the platform is cast around the shank.

16. The turbine airfoil and platform assembly of claim 10, wherein the pins are formed and inserted through the holes in the shank, then the platform is bi-cast around the shank and the pins.

17. A method of assembling a turbine airfoil and platform comprising:
forming a turbine airfoil by a first process using a first material, the airfoil comprising a shank with a pin hole;
forming a platform by a second process using a second material;
enclosing or bracketing the shank with the platform; and
disposing a pin in the pin hole without forming a hole in the platform that extends to an outer surface of the platform.

18. The method of claim 17 wherein the second material is a different material than the first material.

19. The method of claim 17 wherein the platform is formed in the second process by placing a mold around the shank, casting the platform within the mold around the shank, which casting fills the pin hole with the second material, and wherein the first material has higher heat tolerance than the second material.

20. The method of claim 17, wherein the pin is pre-formed and inserted through the hole in the shank, then the platform is bi-cast around the shank and the pin, completely covering the pin.

* * * * *